(12) United States Patent
Pearson et al.

(10) Patent No.: US 7,596,216 B2
(45) Date of Patent: *Sep. 29, 2009

(54) SYSTEM AND METHOD FOR IDENTIFYING REDIRECTED CALLS

(75) Inventors: Larry B. Pearson, San Antonio, TX (US); Dianna Inara Tiliks, Palatine, IL (US); John Wesley Moss, Lake Zurich, IL (US); Barbara Allyn Vozar, Brunswick, OH (US); Robert Carl Hager, Euclid, OH (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/243,326

(22) Filed: Oct. 1, 2008

(65) Prior Publication Data

US 2009/0028319 A1      Jan. 29, 2009

Related U.S. Application Data

(63) Continuation of application No. 11/801,971, filed on May 11, 2007, now Pat. No. 7,450,710, which is a continuation of application No. 10/656,928, filed on Sep. 5, 2003, now Pat. No. 7,239,690.

(51) Int. Cl.
*H04M 3/42* (2006.01)
*H04M 3/54* (2006.01)

(52) U.S. Cl. .......................... 379/207.16; 379/211.01; 379/211.02; 379/373.02; 379/911

(58) Field of Classification Search ............ 379/207.16, 379/211.01, 211.02, 221.08, 373.01, 373.02, 379/911

See application file for complete search history.

(56) References Cited

U.S. PATENT DOCUMENTS 7,239,690 B2 *  7/2007  Pearson et al. ......... 379/207.16
7,450,710 B2 * 11/2008  Pearson et al. ......... 379/207.16

\* cited by examiner

*Primary Examiner*—Harry S Hong
(74) *Attorney, Agent, or Firm*—Toler Law Group

(57) ABSTRACT

Methods and systems for identifying redirected calls are provided. A particular method includes receiving a redirected call. When the redirected call is redirected from a first address, the method includes generating a first distinctive ring at a communication device. When the redirected call is not redirected from the first address, the method includes generating a second distinctive ring at the communication device.

20 Claims, 6 Drawing Sheets

SYSTEM AND METHOD FOR IDENTIFYING REDIRECTED CALLS

CLAIM OF PRIORITY

This application is a Continuation patent application of, and claims priority from, U.S. patent application Ser. No. 11/801,971, filed on May 11, 2007 and entitled "SYSTEM AND METHOD FOR IDENTIFYING REDIRECTED CALLS," which is a continuation of U.S. patent application Ser. No. 10/656,928, now U.S. Pat. No. 7,239,690, filed on Sep. 5, 2003 and entitled "SYSTEM AND METHOD FOR IDENTIFYING REDIRECTED CALLS," both of which are hereby incorporated by reference in their entirety.

FIELD OF THE DISCLOSURE

This disclosure, in general, relates to systems and methods for identifying redirected calls.

BACKGROUND

As the population becomes more reliant on telecommunications services, more people utilize call-forwarding features to avoid missing calls. Call forwarding can typically be activated to redirect phone calls made to a particular phone to an alternate number. However, when calls are received at the alternate number, there is typically no indication that the call has been redirected.

One might expect that inbound forwarded calls could be identified using caller ID. However, caller ID only provides the original call party number, when available, and not the intermediate phone numbers through which the call has been forwarded. Assuming that the calling party number is available through caller ID, the phone number might be used by the subscriber to determine whether the call was forwarded or dialed directly. However, the determination, in this case, is unreliable. A co-worker may dial the subscriber's office phone after hours just to leave a message. The co-worker would not expect that the call would be answered. In this case, the subscriber might let the call forward to a voice mail service or allow an answering machine to pick up the call. However, what if it were an emergency and the co-worker dialed the subscriber's home number directly? The subscriber might not answer the call, not recognizing the urgency of the inbound call. As such, in these typical systems, the subscriber cannot differentiate direct inbound calls from calls forwarded through another number.

As such, typical call-forwarding systems or features may result in confusion on both the part of the subscriber and originating callers. Therefore, an improved system and method for call redirection would be desirable.

DETAILED DESCRIPTION

This disclosure, in general, relates to systems and methods for identifying redirected calls. In one embodiment, a service control point identifies forwarded or redirected calls and a distinctive ring is used to notify the user that the call has been redirected from another phone number.

Figure 1:
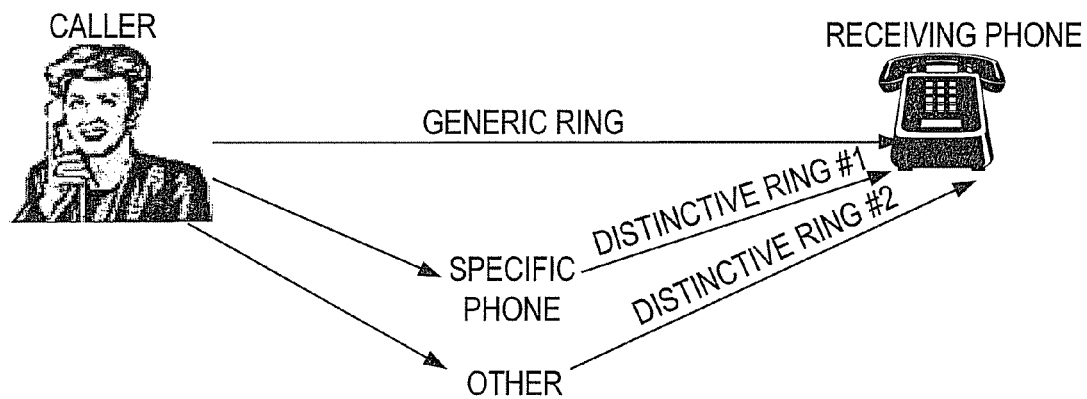
FIG. 1 depicts an exemplary call-forwarding scenario.

FIG. 1 depicts an exemplary embodiment, of a redirected call ring feature. The receiving phone rings when a call is attempted. If the caller calls directly to the receiving phone, the receiving phone may utilize a generic ring. Alternately, if the caller calls a number that redirects the call to the receiving phone, the call may ring with a distinctive ring. In one exemplary embodiment, a specific distinctive ring may be utilized to indicate calls redirected from a specific phone number. In another embodiment, a distinctive ring may be utilized to indicate a redirected call from any phone number or from phone numbers other than the specific phone number.

Figure 2:
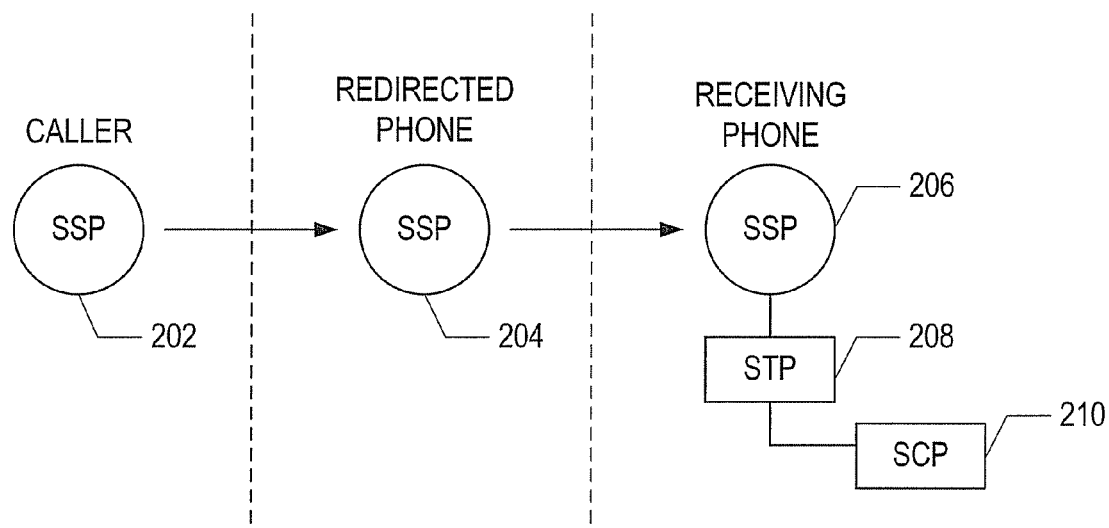
FIG. 2 depicts exemplary calling states provided by an illustrative telecommunications system.

FIG. 2 depicts an exemplary system for implementing a redirected call ring feature. A caller may initiate a phone call at service switch point 202. The service switch point 202 may send a call termination attempt message to the call address associated with a service switch point 204. The service switch point (SSP) 204, may determine that a call-forwarding feature is activated for the called address. For example, the SSP 204 may access a service control point (not shown) to determine that call forwarding has been activated for the called address and to determine an alternate phone number or network address to which the call is to be forwarded. The SSP 204 may then send a call termination attempt message to an SSP 206 associated with the alternate phone number or network address to which the call is to be forwarded.

The SSP 206 may make a query to a service control point (SCP) 210 via a signal transfer point (STP) 208. The STP 208 may be used to route messages between the SSP 206 and SCP 210. The STP 208 routes messages between networking elements. The SSP 206 may query the SCP 210 upon receiving a call termination attempt message to check for call features such as voicemail, call-forwarding, and other telephone service related features. The call termination attempt message and the query associated with the call termination attempt may include a caller's network address, the receiving phone network address and if the call has been redirected, the phone network address through which the call was redirected (redirected phone address). The SCP 210 receives the query and determines whether the call has been redirected. If the call has been redirected and a redirected call ring feature is active for the receiving phone network address, the SCP 210 may direct the SSP 206 to utilize a distinctive ring, indicating that the call has been redirected. If the call has not been redirected, and is dialed direct to the receiving phone or if the redirected call ring feature is not active, the call may be initialized utilizing a generic ring.

A distinctive ring may be a ring pattern or musical score played through a telephone or communication device that differs from the ring pattern typically used to indicate an incoming call. The ring pattern typically used to indicate an incoming call is the generic ring. In one embodiment, the distinctive ring may be a ring pattern that is faster or slower than the generic ring pattern. In another embodiment, the distinctive ring may use a mixed tempo pattern or a musical score. In an exemplary embodiment of the SCP 210, a user may create a pattern, select a pattern from a list, or download a desired pattern.

In another embodiment, the SCP 210 may compare the redirected phone network address to a specific network address. If the redirected network address matches the specific address, a specific distinctive ring may be utilized to indicate that the call has been redirected from the specific network address. The SCP 210 may also utilize a second distinctive ring to indicate that a call has been redirected from network addresses other than the specific address.

The SSPs 202, 204 and 206, and the SCP 210 may reside in a network. In one exemplary embodiment, the network may be a public switched telephone network (PSTN) utilizing an SS7 protocol. In an alternate embodiment, the network may also be a voice over internet protocol (IP) based network. The SSP and SS7 exemplary embodiment relates to an Advanced Intelligent Network (AIN). However, the system may also be implemented as a data switch or Private Branch Exchange (PBX) based feature.

Figure 3:
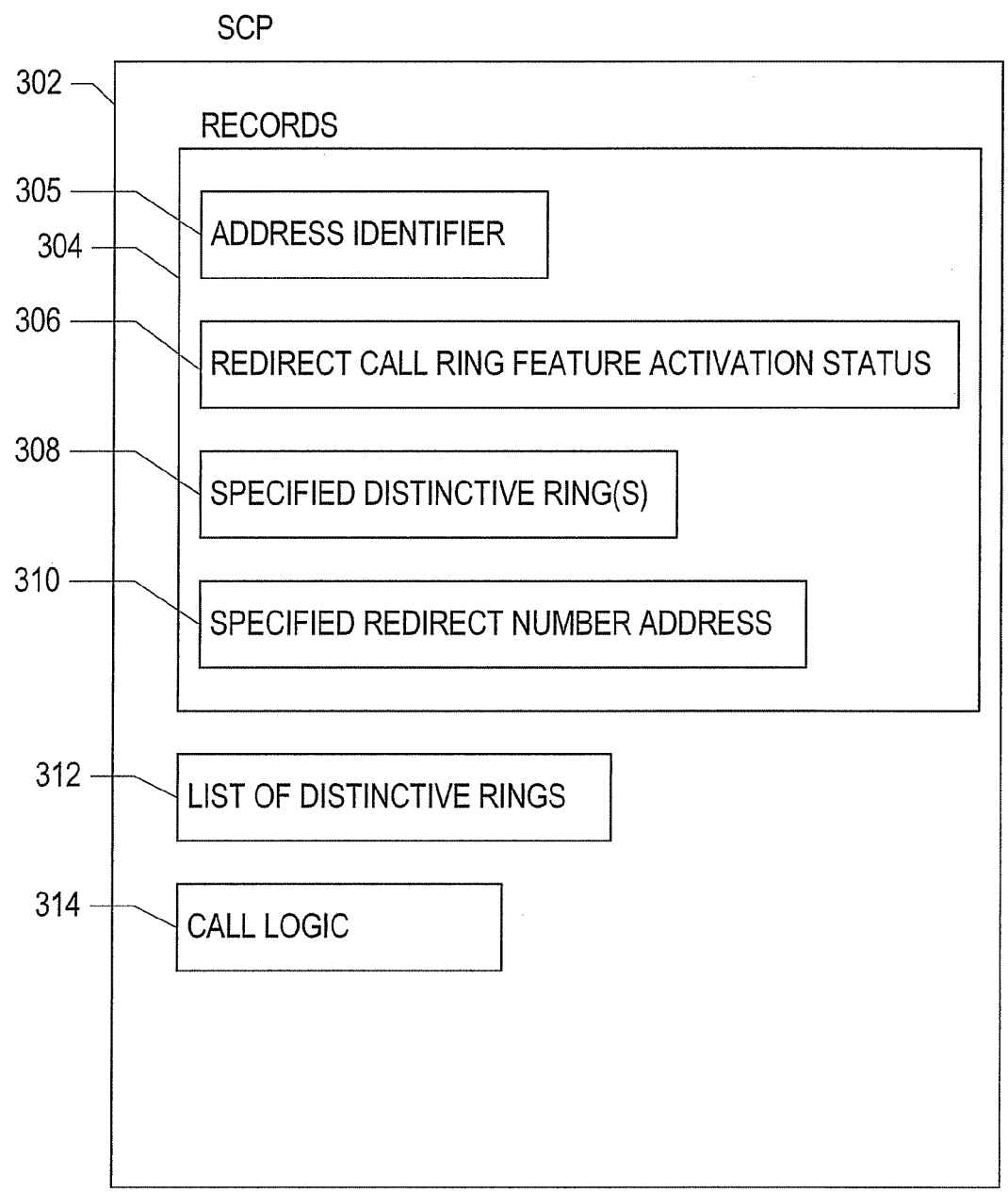
FIG. 3 depicts an exemplary service control point (SCP).

FIG. 3 depicts an exemplary service control point 302. The service control point (SCP) 302 includes data records 304 and computer logic 314. The SCP 302 may also include a list of available distinctive rings 312.

The records 304 may each include an address identifier field 305 and a field for indicating the activation status of a redirect call ring feature 306. The address identifier 305 indicates a network address associated with the record. The activation status 306 indicates whether functions associated with the redirect call ring feature are to be applied to calls directed to the network address associated with the address identifier 305.

In one exemplary embodiment, the record 304 may also include one or more specified distinctive rings 308. These specified distinctive rings 308 may be specified by a user and indicate which ring out of the list of distinctive rings 312 is to be used. The distinctive ring field 308 may also associate a distinctive ring with a specific redirected number address. In one exemplary embodiment, a user may specify a specific redirect number network address 310 and associate with that specific redirect number address 310 a specific distinctive ring 308. If a call from the specified redirect number network address 310 is received, the SCP 302 may direct the use of the specific distinctive ring 308 to the receiving subscriber communications devices. In addition, the user may specify another distinctive ring for use with numbers or calls redirected from numbers other than the specified redirect number address 310.

The SCP 302 may also include logic 314. Logic 314 may comprise software, hardware, or a combination of software and hardware. Logic 314 may act to receive call termination attempt queries and may perform various functions associated with features activated for the network address to which the call attempt is being made. Also, if the redirect call ring feature is active, the logic 314 may initiate distinctive rings for redirected calls.

For example, the logic 314 may access a record 304 having address identifier 305 associated with a network address to which a call attempt is being made. The logic 314 may test the record 304 to determine if the redirect call ring feature is active. The logic 314 may determine whether the query associated with the call attempt includes a redirect network address. If the query includes a redirect network address, the logic 314 may initiate a call using the specified distinctive ring 308. In an alternate embodiment, the logic 314 may compare the redirect network address to the specified redirect number network address 310 and selectively direct the utilization of the specified distinctive ring 308 based on the value of the redirect network address.

The logic 314 of the SCP 302 may also enable user interaction to manipulate values associated with the redirect call ring feature. For example, the logic 314 may permit a user to select a specified distinctive ring 308 from the list of distinctive rings 312. In an alternate embodiment, the logic 314 may permit the user to specify the specified redirect number address 310 and associate a specific distinctive ring with that specified redirect number address 310. In various embodiments, the logic 304 may permit interaction with the records through pound sign (#) command functions, network messages, or Internet based interactions such as through email or a web page.

Figure 4:
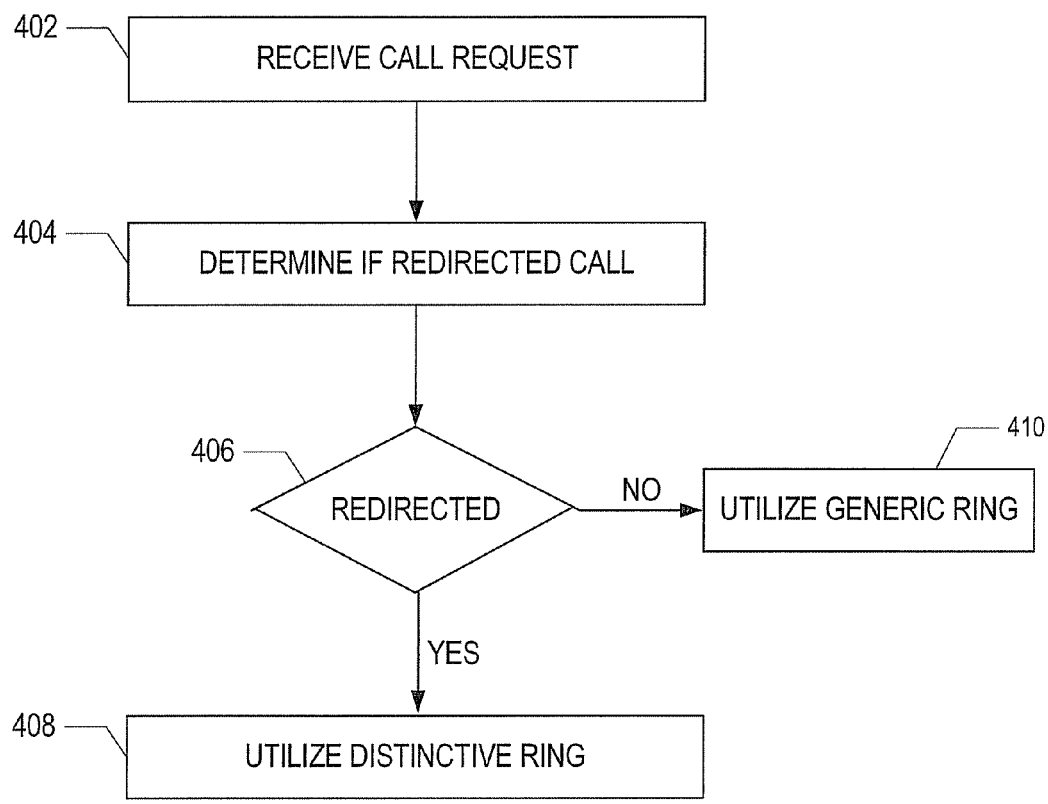
FIGS. 4, 5, 6 and 7 depict exemplary methods for indicating a forwarded call.

FIG. 4 depicts an exemplary method for indicating that a call has been redirected. A call request, call termination attempt, message, or call termination attempt query may be received by a system, as shown at step 402. The system may determine if the call is a redirected call, as shown as step 404. In one exemplary embodiment, the call request or query may be tested for a redirected network address, indicating that the call attempt has been redirected. As shown at step 406, if the call has been redirected, the system may direct the utilization of a distinctive ring to initiate a call, as shown at step 408. However, if the call has not been redirected, the system may direct the utilization of a generic ring, as shown at step 410.

Figure 5:
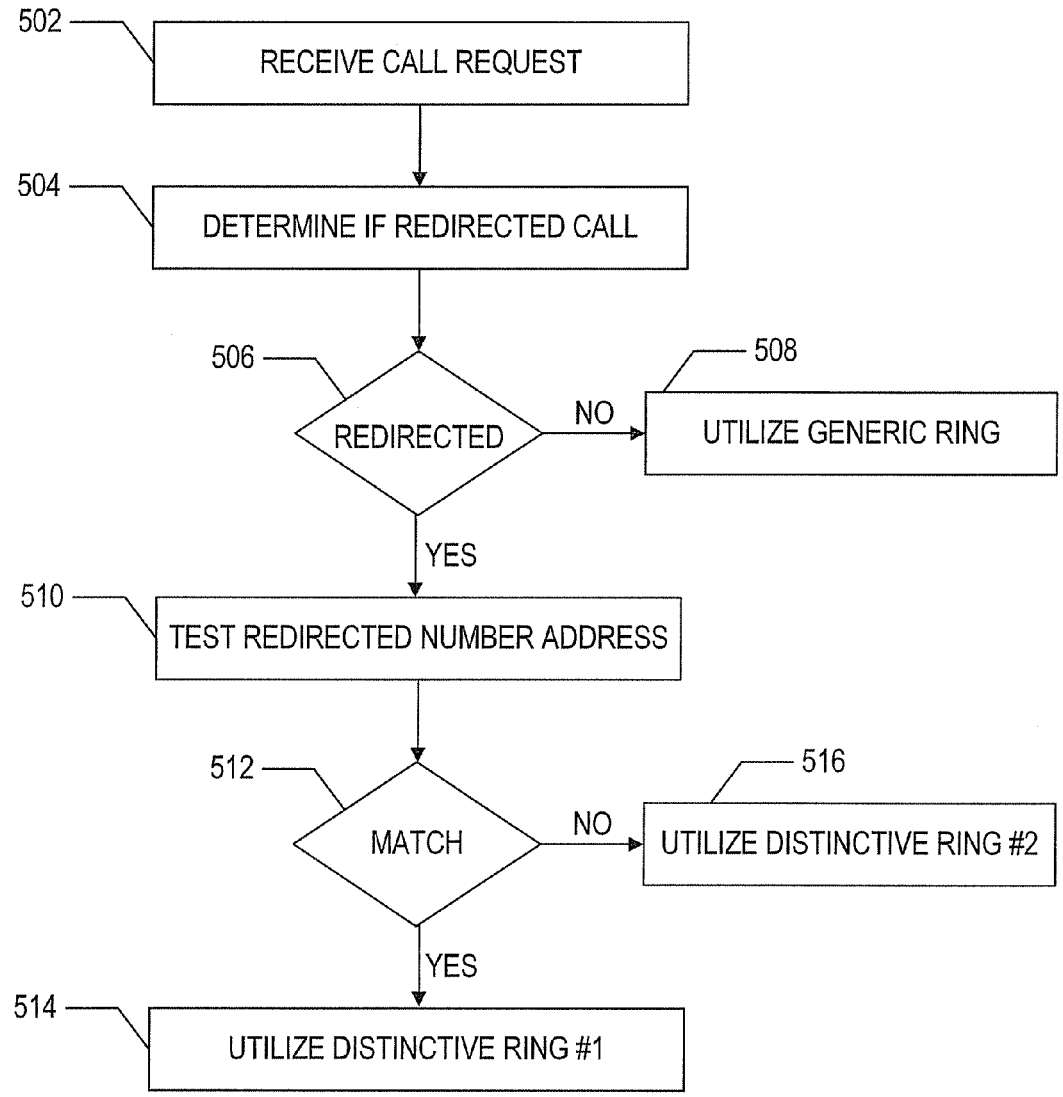

FIG. 5 depicts an alternate embodiment of a method for indicating that a call has been redirected. The system may receive a call request, call termination attempt or call termination attempt query, as shown at step 502. The system may then determine if the call attempt is a redirected call, as shown at step 504. For example, the system may test the request or query to determine if a redirect network address is included in the request or query. If the call has not been redirected, as indicated by step 506, the system may direct the utilization of a generic ring, as shown at step 508.

However, if the call is a redirected call the system may test to determine the redirected number address, as shown at step 510. This may, for example, include parsing a call request or call query. The system may test to determine if the redirected number address matches a specified redirect number address, as shown at step 512. If the redirect number address does not match a specified redirect number address, the system may direct the utilization of a distinctive ring number 2, as shown at step 516. However, if the redirect number address matches a specified network address, the system may direct the utilization of a distinctive ring number 1, as indicated by step 514.

Figure 6:
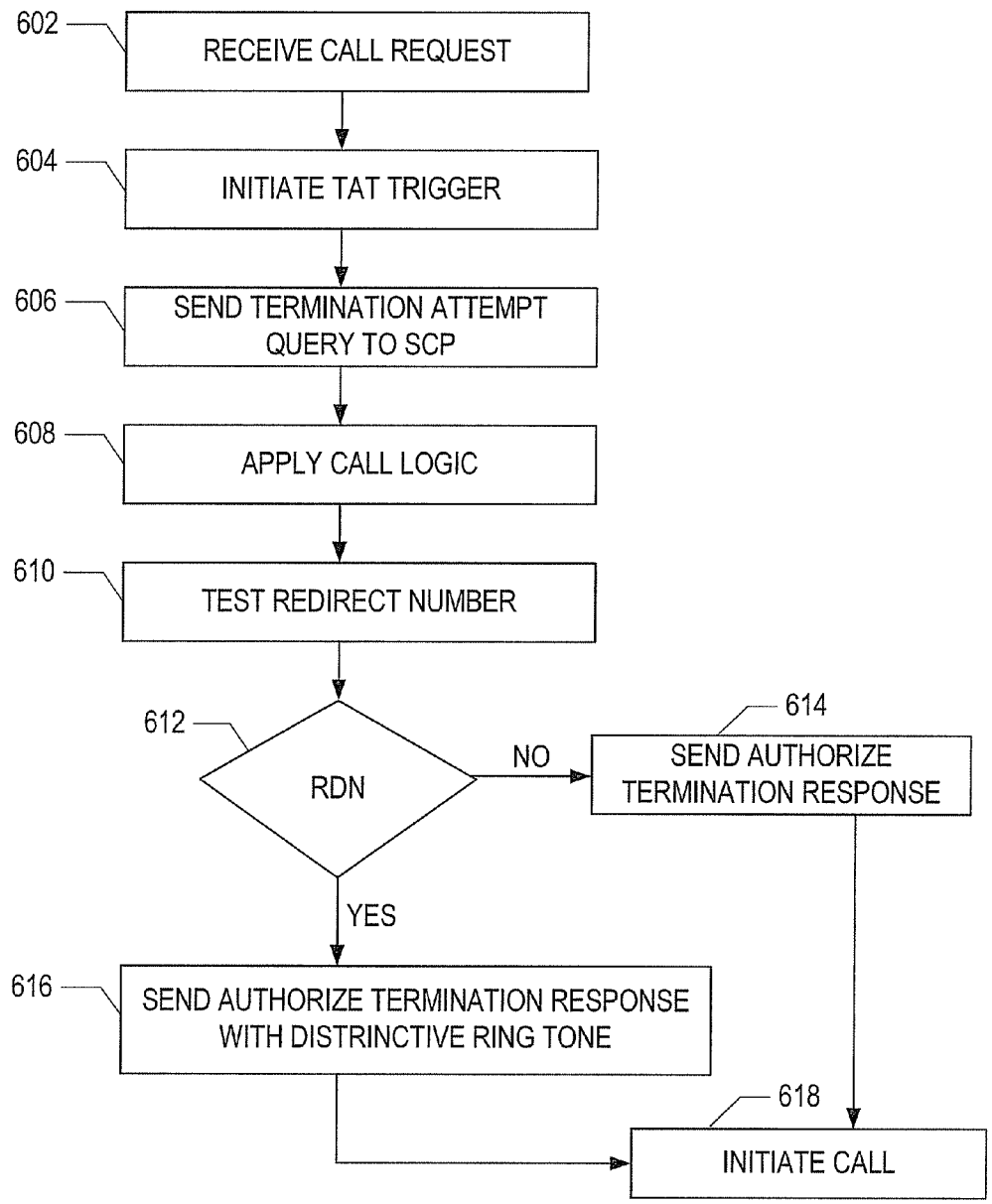

FIG. 6 depicts a further exemplary embodiment of a method for indicating that a call has been redirected. In this exemplary embodiment, an SSP may receive a call termination attempt, as shown at step 602. The SSP may initiate a termination attempt trigger, as shown at step 604, and send a termination attempt query to a SCP, as shown at step 606. The SCP may apply call logic in response to receiving the termination attempt query, as shown at step 608. For example, the SCP may determine whether call forwarding has been activated for a network address associated with the termination attempt. The SCP may also determine whether a redirect call ring feature is activated for the network address associated with the termination attempt. The termination attempt query may, for example, include a call initiating network address, a destination network address, and a redirected network address. The SCP may test the call termination attempt query for the redirect number address, as shown at step 610. The SCP may make a decision based on the presence of a redirect number address (RDN), as shown at step 612. If the call termination attempt query does not include a redirect number address, the SCP may send an authorization termination response, as shown at step 614. This authorization termination response may result in the use of a generic ring when initiating a call to a destination device.

However, if a redirect number address is present, the system may send an authorized termination response including direction to use a distinctive ring tone, as shown at step 616. This authorization termination response will result in the use of the distinctive ring when initiating the call, as shown in step 618.

Figure 7:
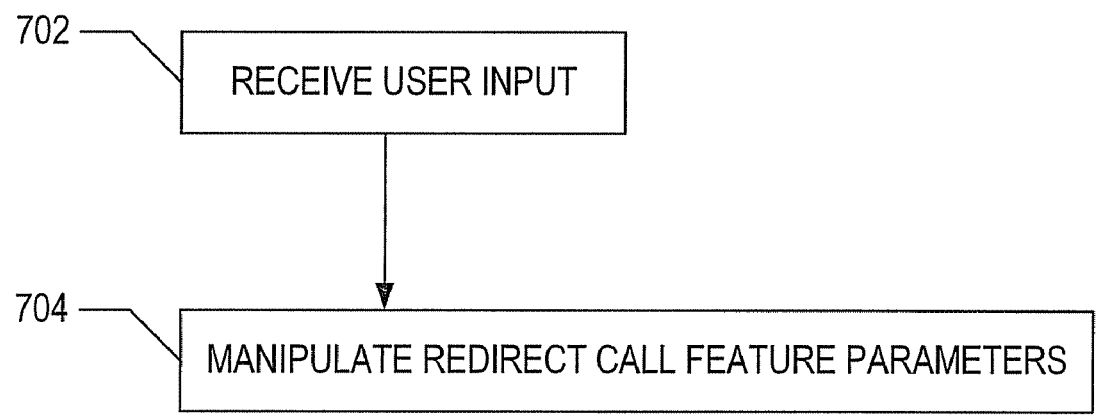

FIG. 7 depicts an exemplary method for establishing a redirect call ring feature. The method includes receiving a user input, as shown at step 702, and manipulating the redirect call ring feature parameters, as shown at step 704. The user input may, for example, be received through pound (#) commands and commands entered via a telephone connected to a PSTN. Alternately, the user input may be received via other electronic means such as a short message service (SMS) system, web page, or email. The system may permit the manipulation of various parameters associated with the redirect call ring feature. These parameters may, for example, include activation or deactivation of the redirect call ring feature, selection of a specific distinctive ring, association of a specific redirect network address with a specific distinctive ring and modifications of these associations.

In a particular embodiment, the disclosure is directed to a system for identifying redirected calls that includes a service switch point and a service control point. The service switch point is coupled to a communications network. The service switch point is configured to receive a call termination request that indicates call redirection. The service control point is coupled to the service switch point and is configured to direct the service switch point to utilize a distinctive ring in response to receiving the call termination request.

In another embodiment, the disclosure is directed to a method of call identification. The method includes receiving a call termination request, determining whether the call termination request indicates a redirected call, and selectively directing the utilization of a distinctive ring when initiating a call based on a determination as to whether the call termination request indicates a redirected call. The call termination request includes a destination address and is configured to request initiation of a call to the destination address.

In a further embodiment, the disclosure is directed to a service control point that includes computer-readable storage, a data record stored in the computer readable storage, and logic. The data record is associated with a telephone network address and is configured to indicate activation status of a redirect call ring feature. The logic is configured to access the data record in response to receiving a call termination query. The logic is configured to determine whether the call termination query indicates a redirected call. The logic is also configured to selectively direct utilization of the redirected call ring feature based on the activation status.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following

What is claimed is:

1. A method of identifying a redirected call, the method comprising:
    receiving the redirected call;
    when the redirected call is redirected from a first address, generating a first distinctive ring at a communication device; and
    when the redirected call is not redirected from the first address, generating a second distinctive ring at the communication device.

2. The method of claim 1, further comprising receiving input specifying the first address via the communication device before receiving the redirected call.

3. The method of claim 1, further comprising receiving input specifying the first address via a second communication device before receiving the redirected call.

4. The method of claim 1, further comprising receiving input specifying the first address via a computing device coupled to a communication network before receiving the redirected call.

5. The method of claim 1, further comprising:
    receiving a call that is not redirected; and
    generating a generic ring at the communication device.

6. The method of claim 1, wherein the first distinctive ring includes a ring pattern created by a user.

7. The method of claim 1, wherein the first distinctive ring includes a ring pattern downloaded by a user.

8. The method of claim 1, wherein the first distinctive ring includes a musical score.

9. The method of claim 1, wherein the redirected call is received via a Voice over Internet Protocol (VoIP) network.

10. The method of claim 1, wherein the redirected call is received via a Public Switched Telephone Network (PSTN).

11. The method of claim 1, wherein the redirected call is received via a Private Branch Exchange (PBX).

12. A method, comprising:
    receiving a call termination request, the call termination request including a redirect number address; and
    sending a query including the redirect number address to a service control point (SCP); and
    receiving, from the SCP, an authorized termination response including a direction to use a selected ring tone, wherein the selected ring tone includes a first distinctive ring when the redirect number address is a first address and wherein the selected ring tone includes a second distinctive ring when the redirect number address is not the first address.

13. The method of claim 12, wherein the selected ring tone is selected based on a configuration record accessible to the SCP.

14. The method of claim 13, wherein the configuration record is modified based on input received via an Internet message.

15. The method of claim 13, wherein the configuration record is modified based on input received via a short message service (SMS) message.

16. The method of claim 13, wherein the configuration record is modified based on input received via a telephone.

17. The method of claim 12, further comprising initiating a termination attempt trigger after receiving the call termination request, wherein the query is sent in response to initiation of the termination attempt trigger.

18. The method of claim 12, further comprising signaling a communication device to ring using the selected ring tone.

19. A system comprising:
    a network connection to a service control point (SCP); and
    computer logic responsive to the network connection, the computer logic operable to execute computer-readable instructions to:
        receive a call termination request via the network connection, the call termination request including a redirect number address;
        send a query message including the redirect number address to the SCP; and
        receive, from the SCP, an authorized termination response including a direction to use a selected ring tone, wherein the selected ring tone includes a first distinctive ring when the redirection number address is a first address and wherein the selected ring tone includes a second distinctive ring when the redirection number address is not the first address.

20. The system of claim 19, wherein the query message further includes a call initiating network address and a destination network address.

* * * * *